United States Patent
Rutherford et al.

(10) Patent No.: US 7,567,404 B1
(45) Date of Patent: *Jul. 28, 2009

(54) METHOD FOR MEASURING ACTUATOR VELOCITY DURING SELF-SERVO-WRITE

(75) Inventors: David Rutherford, San Jose, CA (US); Luan Ton-That, San Jose, CA (US)

(73) Assignee: Marvell World Trade Ltd., St. Michael (BB)

(*) Notice: Subject to any disclaimer, the term of this patent is extended or adjusted under 35 U.S.C. 154(b) by 0 days.

This patent is subject to a terminal disclaimer.

(21) Appl. No.: 12/077,582

(22) Filed: Mar. 20, 2008

Related U.S. Application Data

(63) Continuation of application No. 11/544,253, filed on Oct. 9, 2006, now Pat. No. 7,349,171.

(60) Provisional application No. 60/779,601, filed on Mar. 6, 2006.

(51) Int. Cl.
*G11B 21/08* (2006.01)

(52) U.S. Cl. ............................... 360/75; 360/78.06

(58) Field of Classification Search ............. None
See application file for complete search history.

(56) References Cited

U.S. PATENT DOCUMENTS

| | | |
|---|---|---|
| 4,635,138 A | 1/1987 | Louth |
| 4,672,474 A | 6/1987 | Rodal |
| 5,089,917 A | 2/1992 | Kanota et al. |
| 5,448,429 A | 9/1995 | Cribbs et al. |
| 5,541,784 A | 7/1996 | Cribbs et al. |
| 5,559,648 A | 9/1996 | Hunter et al. |
| 5,570,247 A | 10/1996 | Brown et al. |
| 5,612,833 A | 3/1997 | Yarmchuk et al. |
| 5,668,679 A | 9/1997 | Swearingen et al. |
| 5,774,298 A | 6/1998 | Cheung et al. |
| 5,907,447 A | 5/1999 | Yarmchuk et al. |
| 5,946,157 A | 8/1999 | Codilian et al. |
| 5,949,603 A | 9/1999 | Brown et al. |
| 6,023,389 A | 2/2000 | Cunningham |
| 6,040,955 A | 3/2000 | Brown et al. |
| 6,169,429 B1 | 1/2001 | Kiriaki |
| 6,260,257 B1 | 7/2001 | Emo |
| 6,304,407 B1 | 10/2001 | Baker et al. |
| 6,324,030 B1 | 11/2001 | Cheung et al. |
| 6,429,989 B1 | 8/2002 | Schultz et al. |
| 6,504,882 B1 | 1/2003 | Kim |
| 6,507,450 B1 | 1/2003 | Elliott |
| 6,600,620 B1 | 7/2003 | Krounbi et al. |

(Continued)

OTHER PUBLICATIONS

U.S. Appl. No. 10/862,414, filed Jun. 8, 2004, Sutardja, Pantas.

(Continued)

*Primary Examiner*—Hoa T. Nguyen
*Assistant Examiner*—James L Habermehl

(57) ABSTRACT

A system comprises a positioning module that positions an actuator arm to read spirals that are prewritten. A frequency measuring module measures a first frequency of sync marks of said spirals. An estimation module calculates a second frequency of said sync marks when said actuator arm moves at a predetermined actuator velocity. A control module calculates an actuator velocity at which said spirals are prewritten based on said first frequency, said second frequency, and said predetermined actuator velocity.

24 Claims, 16 Drawing Sheets

U.S. PATENT DOCUMENTS

| | | | |
|---|---|---|---|
| 6,603,722 B1 | 8/2003 | Taguchi et al. | |
| 6,693,760 B1 | 2/2004 | Krounbi et al. | |
| 6,704,156 B1 | 3/2004 | Baker et al. | |
| 6,735,031 B2 | 5/2004 | Chainer et al. | |
| 6,738,205 B1 | 5/2004 | Moran et al. | |
| 6,775,091 B1 | 8/2004 | Sutardja | |
| 6,775,338 B1 | 8/2004 | Sutardja | |
| 6,924,960 B1 | 8/2005 | Melkote et al. | |
| 6,937,420 B1 | 8/2005 | McNab et al. | |
| 6,977,789 B1 | 12/2005 | Cloke | |
| 6,977,794 B1 | 12/2005 | Sun et al. | |
| 6,985,316 B1 * | 1/2006 | Liikanen et al. | 360/69 |
| 6,987,636 B1 * | 1/2006 | Chue et al. | 360/75 |
| 7,019,937 B1 * | 3/2006 | Liikanen et al. | 360/75 |
| 7,046,475 B2 | 5/2006 | Hosokawa | |
| 7,068,459 B1 * | 6/2006 | Cloke et al. | 360/75 |
| 7,136,253 B1 * | 11/2006 | Liikanen et al. | 360/75 |
| 7,149,048 B1 * | 12/2006 | Ray et al. | 360/78.09 |
| 7,209,312 B1 | 4/2007 | Sutardja | |
| 7,230,789 B1 * | 6/2007 | Brunnett et al. | 360/75 |
| 7,248,426 B1 * | 7/2007 | Weerasooriya et al. | 360/75 |
| 7,307,807 B1 | 12/2007 | Han et al. | |
| 7,382,564 B1 * | 6/2008 | Everett et al. | 360/75 |
| 2001/0033451 A1 | 10/2001 | Miles | |
| 2002/0154432 A1 | 10/2002 | Messner et al. | |
| 2003/0210491 A1 | 11/2003 | Kuroda et al. | |
| 2005/0078566 A1 | 4/2005 | Wilson et al. | |
| 2005/0280916 A1 | 12/2005 | Calfee et al. | |
| 2007/0285822 A1 * | 12/2007 | Lau | 360/69 |

OTHER PUBLICATIONS

"Digital Communication" Second Edition, Edward A. Lee et al, University of California at Berkeley; pp. 409-424.

PCT Notification of Transmittal of the International Search Report and the Written Opinion of the International Searching Authority dated Jul. 19, 2007 for Applicaiton No. PCT/US2007/005616; 9 pages.

* cited by examiner

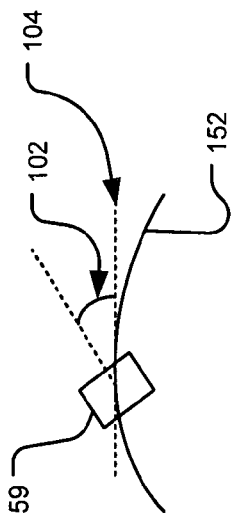
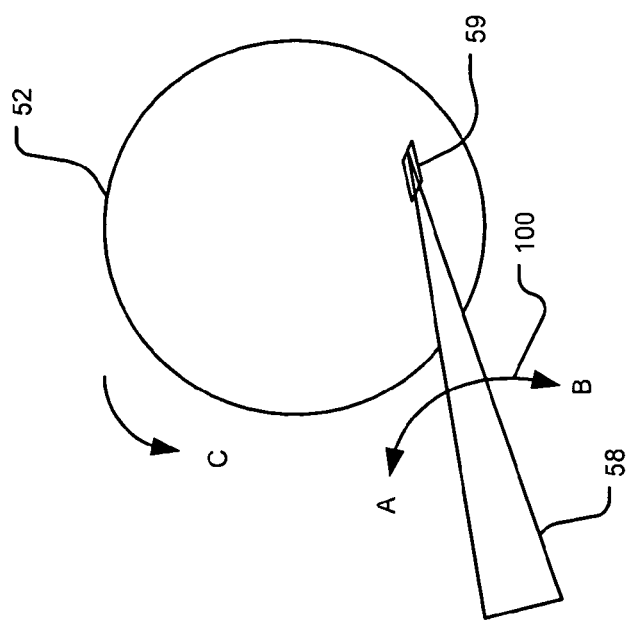
FIG. 4B
FIG. 4A

| Actuator Velocity (IPS) | Frame Sync Timing (counts) |
|---|---|
| 1.5 IPS | 5116.4 counts |
| 2.0 IPS | 5115.8 counts |
| Stationary | 5120 counts |

*FIG. 5C*

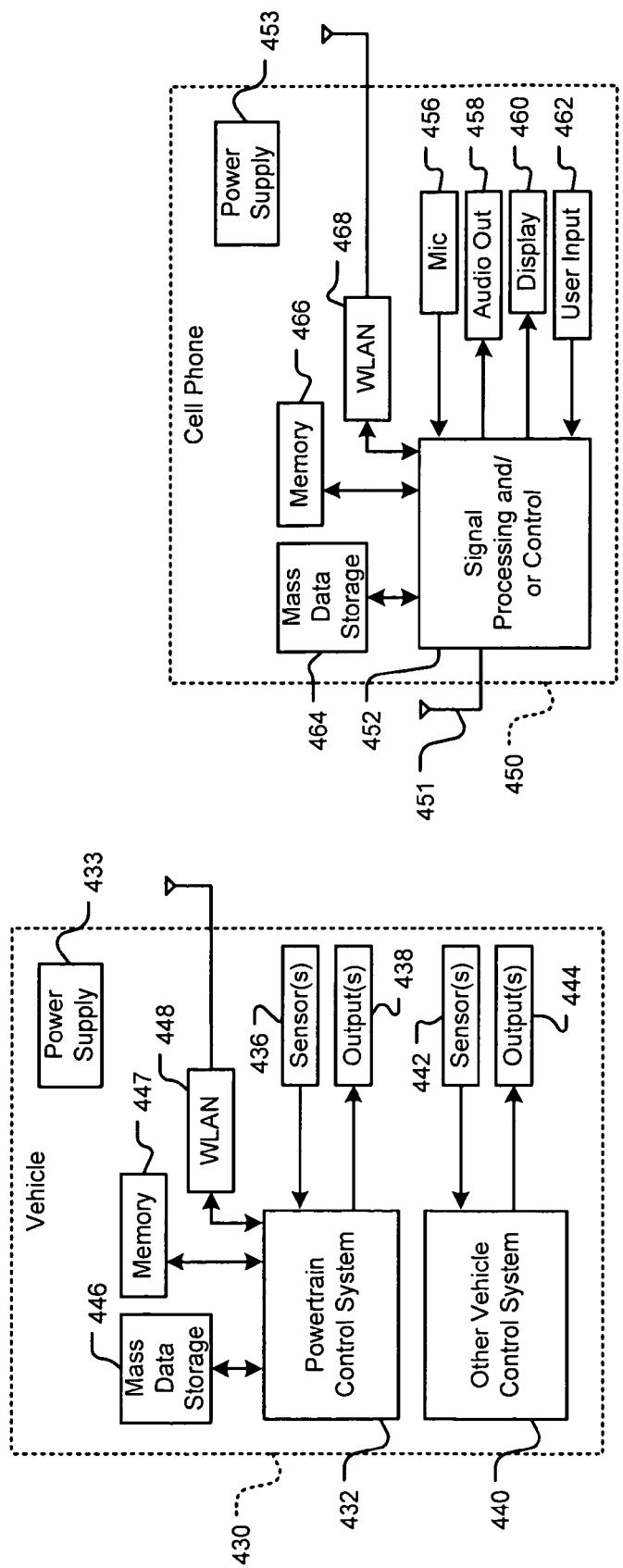

METHOD FOR MEASURING ACTUATOR VELOCITY DURING SELF-SERVO-WRITE

CROSS-REFERENCE TO RELATED APPLICATIONS

This application is a continuation of U.S. patent Ser. No. 11/544,253, filed Oct. 9, 2006, which application claims the benefit of U.S. Provisional Application No. 60/779,601, filed on Mar. 6, 2006. The disclosures of the above applications are incorporated herein by reference in their entirety.

FIELD

The present disclosure relates to hard disk drives (HDDs), and more particularly to systems and methods for measuring actuator velocity at which servo spirals are written in HDDs.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Electronic devices such as computers, laptops, personal video recorders (PVRs), MP3 players, game consoles, set-top boxes, digital cameras, etc., often need to store a large amount of data. Storage devices such as hard disk drives (HDDs) may be used to meet these storage requirements.

Referring now to FIG. 1, a hard disk drive (HDD) 10 includes a hard disk assembly (HDA) 50 and a HDA printed circuit board (PCB) 14. The HDA PCB 14 comprises a buffer module 18 that stores data associated with the control of the HDD 10. The buffer module 18 may employ SDRAM or other types of low latency memory. A processor 22 is arranged on the HDA PCB 14 and performs processing that is related to the operation of the HDD 10.

A hard disk controller (HDC) module 26 communicates with the buffer module 18, the processor 22, a spindle/VCM (voice coil motor) driver module 30, and an input/output interface module 24. The input/output interface module 24 can be a serial interface module, a parallel interface module, a serial Advance Technology Attachment (ATA) interface module, a parallel ATA interface module, etc.

Additionally, the HDC module 26 communicates with a read/write channel module 34. During write operations, the read/write channel module 34 encodes data that is to be written by a read/write device 59. The read/write device 59 may also be referred to as the read/write head 59. The read/write channel module 34 processes data for reliability using error correction coding (ECC), run length limited coding (RLL), etc. During read operations, the read/write channel module 34 converts an analog output of the read/write device 59 into a digital signal. The digital signal is then detected and decoded using known techniques to recover the data written on the HDD 10.

The HDA 50 includes one or more circular recording surfaces called platters 52 that are used to store data. The platters 52 include a magnetic coating for storing data in terms of magnetic fields. The platters 52 are stacked on top of one another in the form of a spindle. The spindle comprising the platters 52 is rotated by a spindle motor 54. Generally, the spindle motor 54 rotates the platters 52 at a fixed speed during read/write operations. The spindle/VCM driver module 30 controls the speed of the spindle motor 54.

One or more actuator arms 58 move relative to the platters 52 during read/write operations. The spindle/VCM driver module 30 also controls the positioning of the actuator arm 58 by using mechanisms such as a voice coil actuator, a stepper motor, etc. For example, a voice coil motor (VCM) 57, which is controlled by the spindle/VCM driver module 30, may be used to control the positioning of the actuator arm 58.

The read/write device 59 is located near a distal end of the actuator arm 58. The read/write device 59 includes a write element such as an inductor (not shown) that generates a magnetic field. The read/write device 59 also includes a read element (such as a magneto-resistive (MR) element, also not shown) that senses magnetic field on the platters 52. The HDA 50 includes a preamp module 60, which amplifies analog read/write signals.

When reading data, the preamp module 60 amplifies low-level signals from the read element and outputs the amplified signal to the read/write channel module 34. While writing data, a write current is generated that flows through the write element of the read/write device 59. The write current is switched to produce a magnetic field having a positive or negative polarity. The positive or negative polarity is stored on the hard drive platters 52 and is used to represent data.

Referring now to FIG. 2, data is typically written on the platters 52 in concentric circles called tracks 70. The tracks 70 are divided radially into multiple sectors 72. A circumferential length 74 of sectors 72 decreases as the diameter of the tracks 70 decreases towards the center of the platters 52.

Before performing a read/write operation on a sector 72 of a track 70, the read/write device 59 locks onto the track 70 by referring to positioning information called servo. Servo is generally prewritten on the platters 52 and provides the positioning information that is used by the read/write device 59 to read and write data at correct locations on the platters 52.

Data can be correctly read and/or written if servo is written accurately. Modern HDDs increasingly use self-servo-write (SSW) methods to write their own servo. Disk drives that utilize SSW methods write servo using the same read/write heads that are used to read/write regular data. When writing servo using SSW methods, the read/write heads typically lock onto reference servo sectors (RSS) that are prewritten on the platters 52 either concentrically or in the form of spirals.

Referring now to FIGS. 3A-3B, a SSW module 28 may communicate with the processor 22 and the HDC module 26 as shown in FIG. 3A. The SSW module 28 may generate control signals to write servo on platters 52. For example, the SSW module 28 may generate control commands that control movement of the actuator arm 58 during servo writing. The HDC module 26 and the spindle/VCM driver module 30 may implement the control commands during SSW. The SSW module 28 generates a servo pattern that is written on the platters 52 using the read/write device 59. Additionally, the SSW module 28 may utilize the processor 22 to verify the servo pattern by performing read-after-write operations, etc.

During SSW, the platters 52 may rotate in direction A, and the actuator arm 58 may move in direction B as shown in FIG. 3B. A disk drive typically uses motion delimiters called crashstops that prevent the actuator arm 58 from moving beyond safe limits. For example, the VCM 57 causes the actuator arm 58 to move between crashstop 55 and crashstop 53 while the read/write device 59 writes servo spirals 80 between tracks 70. The crashstop 55 may be referred to as an outer diameter (OD) crashstop 55. The crashstop 53 may be referred to as an inner diameter (ID) crashstop 53. Motion delimiters may include a head loading ramp (not shown).

Spirals 80 may be written from ID to OD of the disk or from OD to ID of the disk. When spirals 80 are written, the actuator arm 58 is accelerated from a stationary position to a predetermined velocity by applying current to the VCM 57. Spirals 80 are written accurately when the actuator arm 58 moves at the predetermined velocity.

SUMMARY

A system comprises a positioning module, a frequency measuring module, a simulation module and a control module. The positioning module positions an actuator arm adjacent to a track to read spirals that are prewritten using current of a predetermined frequency. The frequency measuring module measures a first frequency of sync marks of the spirals when the actuator arm is positioned adjacent to the track. The simulation module calculates a second frequency of the sync marks when the actuator arm moves at a predetermined actuator velocity. The control module calculates an actuator velocity at which the spirals are prewritten based on the first frequency, the second frequency, and the predetermined actuator velocity.

In another feature, the system further comprises a hard disk controller (HDC) module that communicates with the positioning module and that executes a command output by the positioning module to position the actuator arm adjacent to the track.

In another feature, the positioning module outputs a command to position the actuator arm adjacent to an inner diameter (ID) crashstop in a disk drive. The frequency measuring module measures the first frequency when the actuator arm is positioned adjacent to an inner diameter (ID) crashstop in a disk drive.

In another feature, the frequency measuring module measures the first frequency by measuring a time difference between time stamps of two of the sync marks that are adjacent and by inverting the time difference. The frequency measuring module measures the first frequency by measuring time differences between time stamps of a plurality of the sync marks that are adjacent, by calculating an average of the time differences, and by inverting the average.

In another feature, the simulation module generates a sensitivity function for the predetermined actuator velocity based on a geometry of a disk drive. The simulation module calculates the second frequency from the sensitivity function based on the predetermined frequency and a radius of the track. The sensitivity function is a function of a frequency delta and a radius of tracks, and wherein the frequency delta is a ratio of a difference between the second and the predetermined frequencies to the predetermined frequency. The simulation module calculates the second frequency by selecting a value of the sensitivity function at a radius of the track and by substituting the predetermined frequency in the sensitivity function.

In another feature, the control module calculates the actuator velocity by multiplying the predetermined actuator velocity by a ratio of the first frequency to the second frequency at the predetermined actuator velocity.

In another feature, the system further comprises a read-write channel module that communicates with the frequency measuring module and that generates time stamps when the sync marks are detected.

In still other features, a method comprises positioning an actuator arm adjacent to a track to read spirals that are prewritten using current of a predetermined frequency, measuring a first frequency of sync marks of the spirals when the actuator arm is positioned adjacent to the track, calculating a second frequency of the sync marks when the actuator arm moves at a predetermined actuator velocity, and calculating an actuator velocity at which the spirals are prewritten based on the first frequency, the second frequency, and the predetermined actuator velocity.

In another feature, the method further comprises executing a command to position the actuator arm adjacent to the track.

In another feature, the method further comprises generating a command to position the actuator arm adjacent to an inner diameter (ID) crashstop in a disk drive. The method further comprises measuring the first frequency when the actuator arm is positioned adjacent to an inner diameter (ID) crashstop in a disk drive.

In another feature, the method further comprises measuring the first frequency by measuring a time difference between time stamps of two of the sync marks that are adjacent and by inverting the time difference. The method further comprises measuring the first frequency by measuring time differences between time stamps of a plurality of the sync marks that are adjacent, by calculating an average of the time differences, and by inverting the average.

In another feature, the method further comprises generating a sensitivity function for the predetermined actuator velocity based on a geometry of a disk drive. The method further comprises calculating the second frequency from the sensitivity function based on the predetermined frequency and a radius of the track. The sensitivity function is a function of a frequency delta and a radius of tracks, and wherein the frequency delta is a ratio of a difference between the second and the predetermined frequencies to the predetermined frequency. The method further comprises calculating the second frequency by selecting a value of the sensitivity function at a radius of the track and by substituting the predetermined frequency in the sensitivity function.

In another feature, the method further comprises calculating the actuator velocity by multiplying the predetermined actuator velocity by a ratio of the first frequency to the second frequency at the predetermined actuator velocity.

In another feature, the method further comprises generating time stamps when the sync marks are detected.

In another feature, a system comprises positioning means for positioning an actuator arm adjacent to a track to read spirals that are prewritten using current of a predetermined frequency. The system further comprises frequency measuring means for measuring a first frequency of sync marks of the spirals when the actuator arm is positioned adjacent to the track. The system further comprises simulation means for calculating a second frequency of the sync marks when the actuator arm moves at a predetermined actuator velocity. The system further comprises control means for calculating an actuator velocity at which the spirals are prewritten based on the first frequency, the second frequency, and the predetermined actuator velocity.

In another feature, the system further comprises hard disk controller (HDC) means for communicating with the positioning means and executing a command output by the positioning means to position the actuator arm adjacent to the track.

In another feature, the positioning means outputs a command to position the actuator arm adjacent to an inner diameter (ID) crashstop in a disk drive. The frequency measuring means measures the first frequency when the actuator arm is positioned adjacent to an inner diameter (ID) crashstop in a disk drive.

In another feature, the frequency measuring means measures the first frequency by measuring a time difference between time stamps of two of the sync marks that are adjacent and by inverting the time difference. The frequency measuring means measures the first frequency by measuring time differences between time stamps of a plurality of the sync marks that are adjacent, by calculating an average of the time differences, and by inverting the average.

In another feature, the simulation means generates a sensitivity function for the predetermined actuator velocity based on a geometry of a disk drive. The simulation means calculates the second frequency from the sensitivity function based on the predetermined frequency and a radius of the track. The sensitivity function is a function of a frequency delta and a radius of tracks, wherein the frequency delta is a ratio of a difference between the second and the predetermined frequencies to the predetermined frequency. The simulation means calculates the second frequency by selecting a value of the sensitivity function at a radius of the track and by substituting the predetermined frequency in the sensitivity function.

In another feature, the control means calculates the actuator velocity by multiplying the predetermined actuator velocity by a ratio of the first frequency to the second frequency at the predetermined actuator velocity.

In another feature, the system further comprises read-write channel means for communicating with the frequency measuring means and generating time stamps when the sync marks are detected.

In still other features, a computer program executed by a processor comprises positioning an actuator arm adjacent to a track to read spirals that are prewritten using current of a predetermined frequency, measuring a first frequency of sync marks of the spirals when the actuator arm is positioned adjacent to the track, calculating a second frequency of the sync marks when the actuator arm moves at a predetermined actuator velocity, and calculating an actuator velocity at which the spirals are prewritten based on the first frequency, the second frequency, and the predetermined actuator velocity.

In another feature, the computer program further comprises executing a command to position the actuator arm adjacent to the track.

In another feature, the computer program further comprises generating a command to position the actuator arm adjacent to an inner diameter (ID) crashstop in a disk drive. The computer program further comprises measuring the first frequency when the actuator arm is positioned adjacent to an inner diameter (ID) crashstop in a disk drive.

In another feature, the computer program further comprises measuring the first frequency by measuring a time difference between time stamps of two of the sync marks that are adjacent and by inverting the time difference. The computer program further comprises measuring the first frequency by measuring time differences between time stamps of a plurality of the sync marks that are adjacent, by calculating an average of the time differences, and by inverting the average.

In another feature, the computer program further comprises generating a sensitivity function for the predetermined actuator velocity based on a geometry of a disk drive. The computer program further comprises calculating the second frequency from the sensitivity function based on the predetermined frequency and a radius of the track. The sensitivity function is a function of a frequency delta and a radius of tracks, and wherein the frequency delta is a ratio of a difference between the second and the predetermined frequencies to the predetermined frequency. The computer program further comprises calculating the second frequency by selecting a value of the sensitivity function at a radius of the track and by substituting the predetermined frequency in the sensitivity function.

In another feature, the computer program further comprises calculating the actuator velocity by multiplying the predetermined actuator velocity by a ratio of the first frequency to the second frequency at the predetermined actuator velocity.

In another feature, the computer program further comprises generating time stamps when the sync marks are detected.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4A depicts radial movement of an actuator arm relative to rotating platters in a disk drive;

FIG. 4B depicts a skew angle that a read/write head makes relative to a circular track in a disk drive;

FIG. 5C is a table showing exemplary frame sync counts counted at different actuator velocities;

FIG. 7B is a functional block diagram of a vehicle control system;

FIG. 7C is a functional block diagram of a cellular phone;

DETAILED DESCRIPTION

Figure 1:
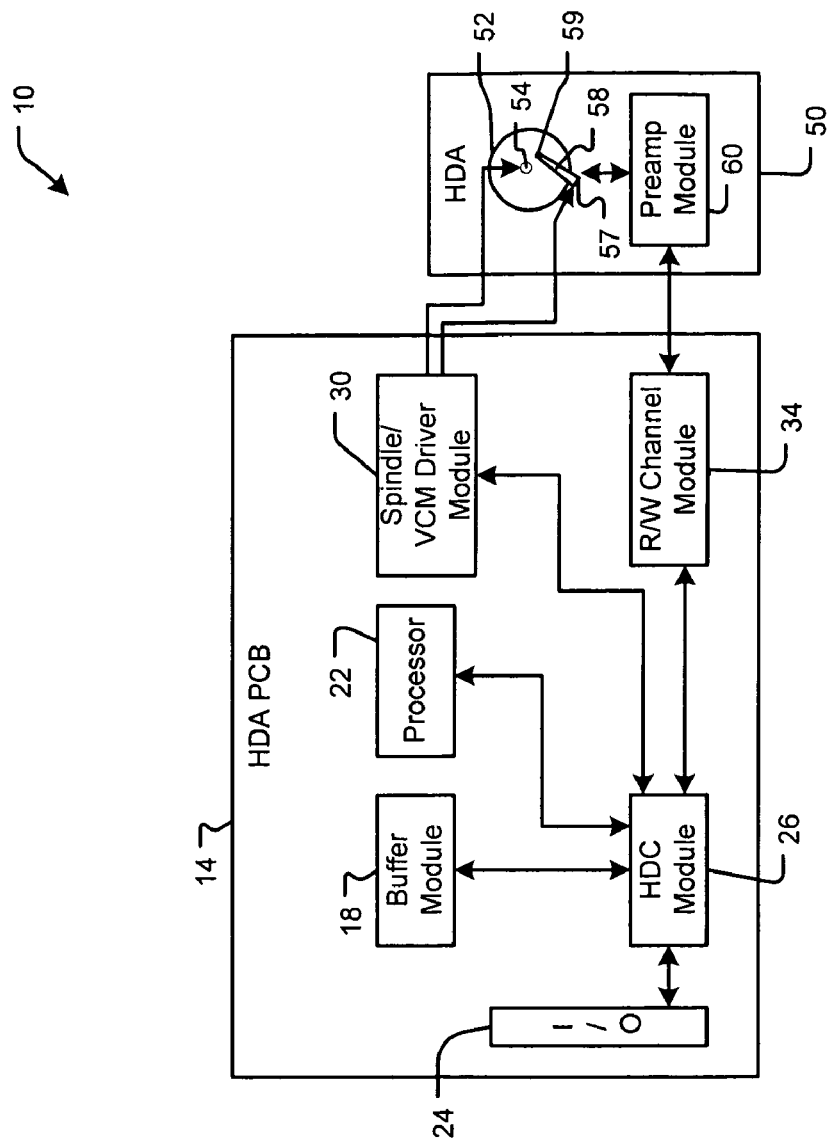
FIG. 1 is a functional block diagram of a disk drive according to the prior art.
Figure 2:
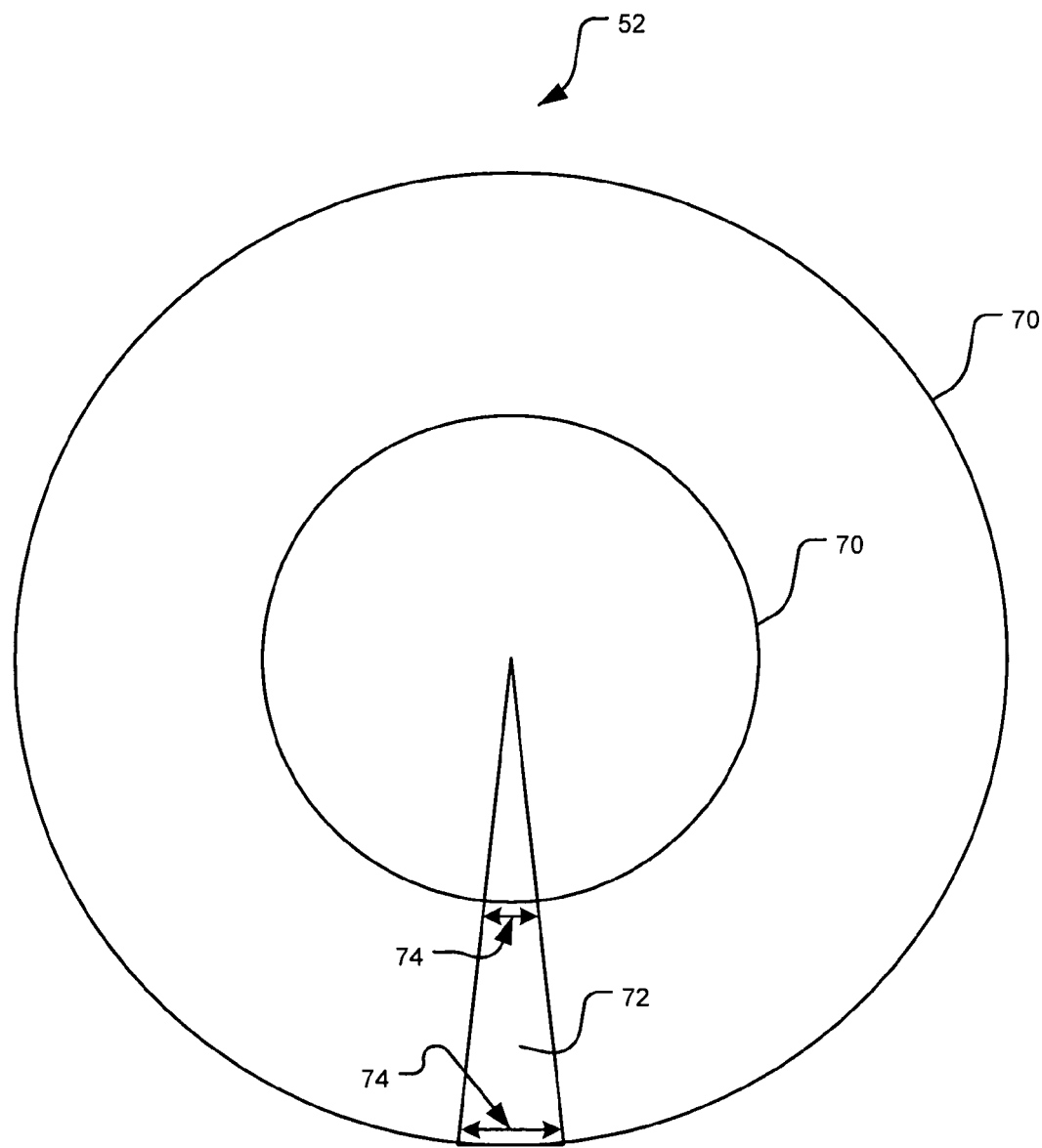
FIG. 2 is a schematic representation of tracks and sectors in disk drives according to the prior art.
Figure 3A:
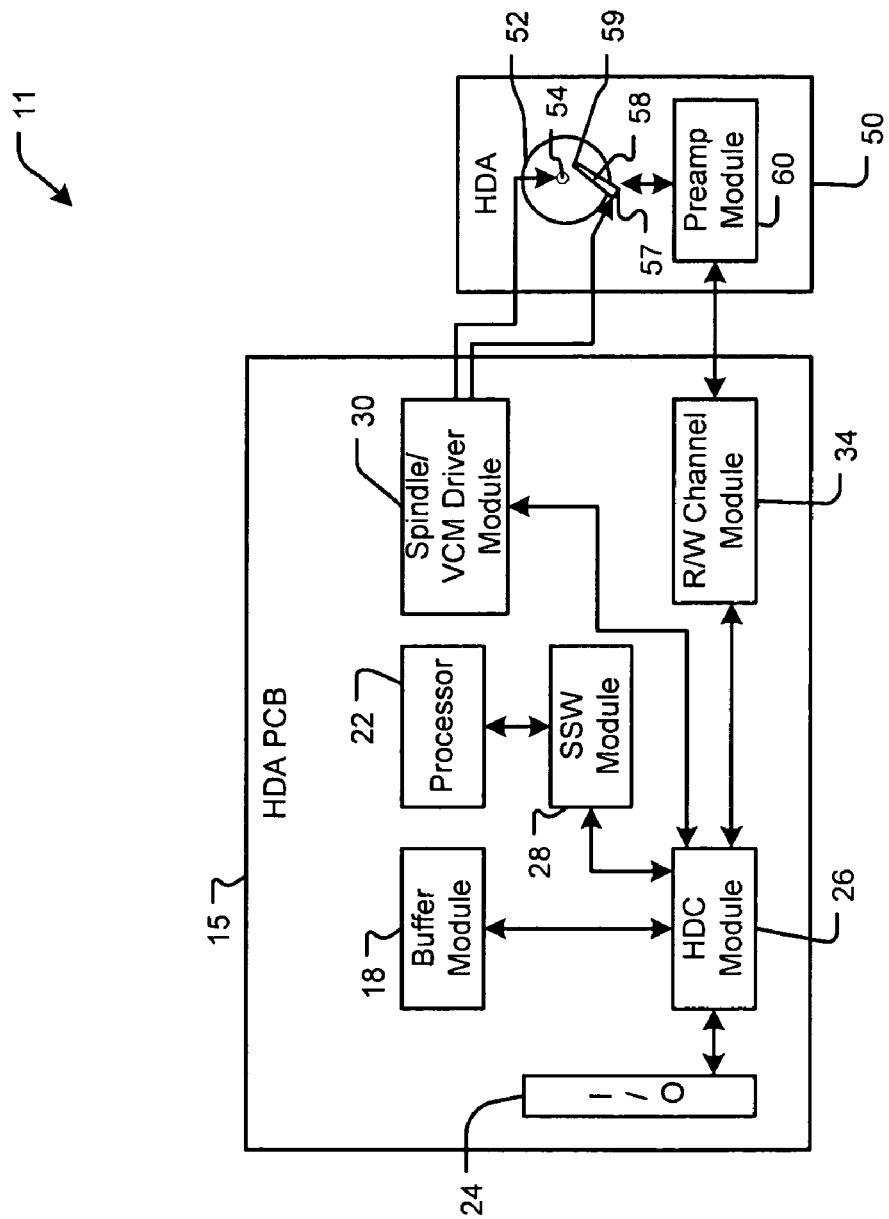
FIG. 3A is a functional block diagram of a disk drive that employs self-servo-write (SSW) methods according to the prior art.
Figure 3B:
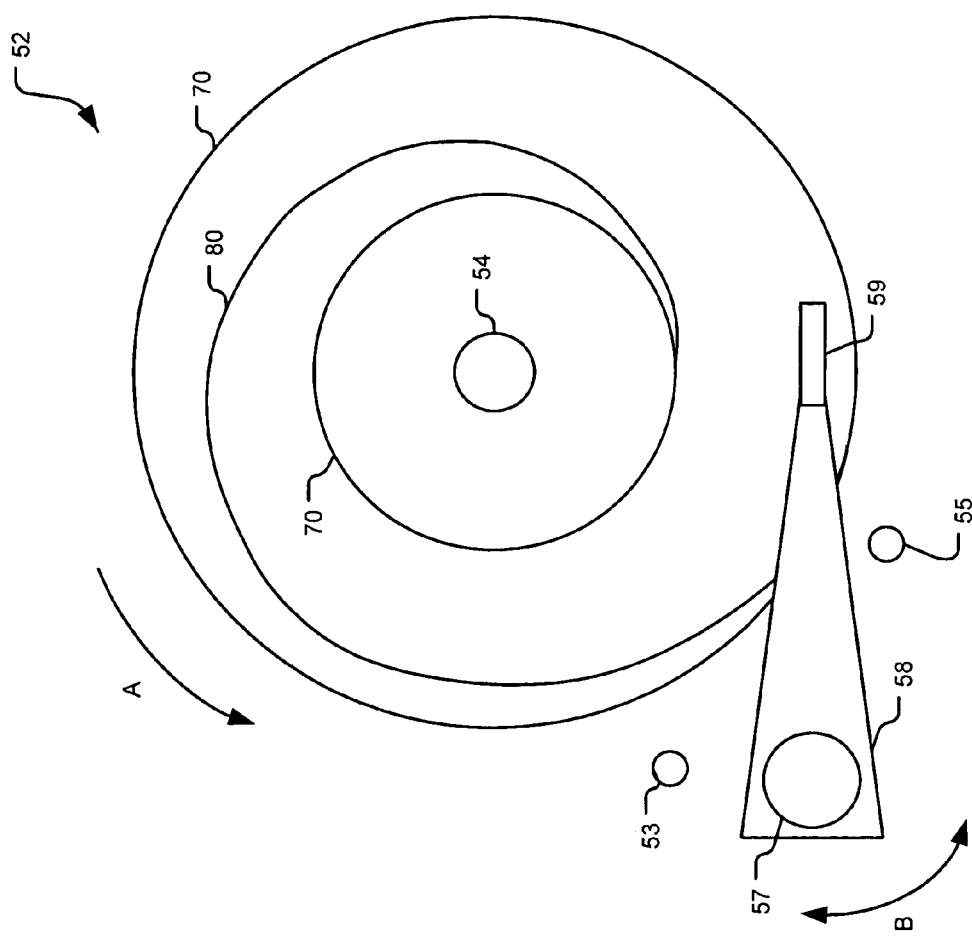
FIG. 3B is a schematic representation of writing servo spirals according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

When spiral servo is written in a disk drive without external actuator velocity control or external actuator velocity sensing, the velocity of the actuator arm at which servo spirals are written may vary due to variations in mechanics of the actuator arm, the spindle, etc. Consequently, the velocity of the actuator arm (i.e., the actuator velocity) at which servo spirals (hereinafrer "spirals") are written may not be known with sufficient accuracy. The actuator velocity at which spirals are written, however, determines position demodulation gain. Thus, accurately measuring actuator velocity at which spirals are written is important.

The present disclosure discloses a method for measuring the actuator velocity at which spirals are written on a blank disk during self-servo-write (SSW). The method is directed at writing spirals in situ, that is, without external actuator velocity control or actuator velocity sensing. The actuator velocity at which spirals are written can be determined by reading the spirals and measuring a read-back frequency of spiral signals. Since spirals are written using an alternating current (AC) of a known or predetermined write frequency, radii of tracks are knowable, and the actuator velocity is not perfectly radial, the actuator velocity at which the spirals are written can be calculated from the read-back frequency.

Referring now to FIGS. 4A-4F, spirals are written on platters 52 by applying an alternating current of a predetermined frequency (i.e., a write frequency) to a write element (not shown) in a read/write head 59. When spirals are written, the actuator arm 58 moves radially in directions A and B relative to the platters 52 as shown by arc 100 in FIG. 4A. Additionally, the platters 52 may move circumferentially in direction C relative to the read/write head 59, which is mounted at a distal end of the actuator arm 58.

Thus, the velocity of the actuator arm 58 (i.e., the actuator velocity) comprises a radial component and a circumferential component. The radial and circumferential components of the actuator velocity alter effective velocity of the read/write head 59 relative to the platters 52. Thus, although spirals are written using current of a predetermined frequency, the frequency that is read back (i.e., the read-back frequency) when spirals are read by the read/write head 59 may be different or shifted from the write frequency. The difference or shift between write and read-back frequencies varies depending on the position of the actuator arm 58 relative to the platters 52. This phenomenon is known as Doppler shift, which may be a red shift or a blue shift.

Figure 4C:
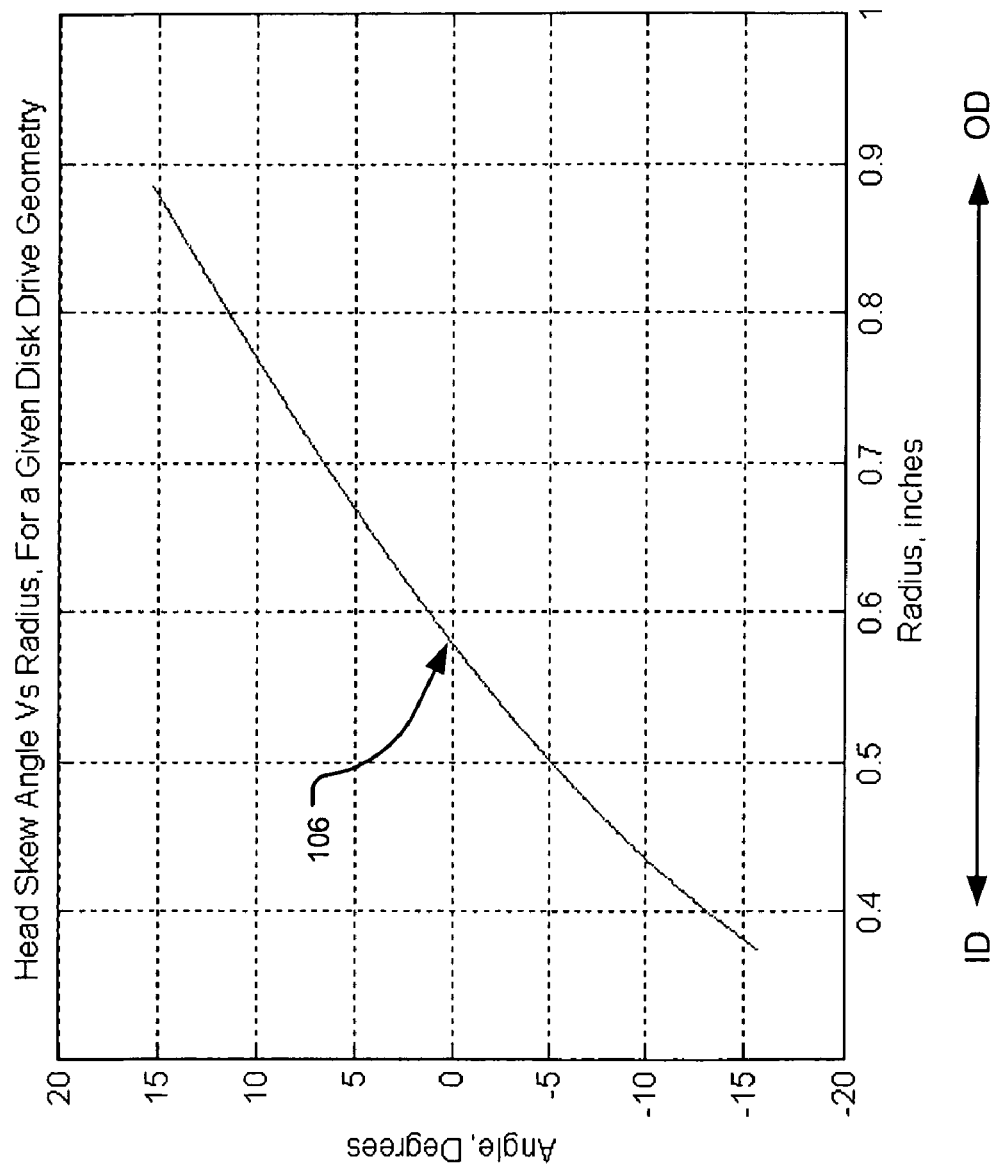
FIG. 4C is a graph of skew angle of a read/write head as a function of track radius.

Specifically, the read/write head 59 travels at an angle 102 relative to a normal 104 to a concentric track 70 as shown in FIG. 4B. The angle 102 is called a skew angle. The skew angle changes as radius of tracks changes from inner diameter (ID) to outer diameter (OD) as shown in FIG. 4C. A zero skew point 106 is a radius of a track at which the skew angle is zero. At zero skew point 106, the circumferential component of the actuator velocity is zero. That is, motion of the actuator arm 58 is entirely radial at zero skew point 106. At all times other than zero skew point 106, the actuator velocity has both the radial and the circumferential components.

Figure 4D:
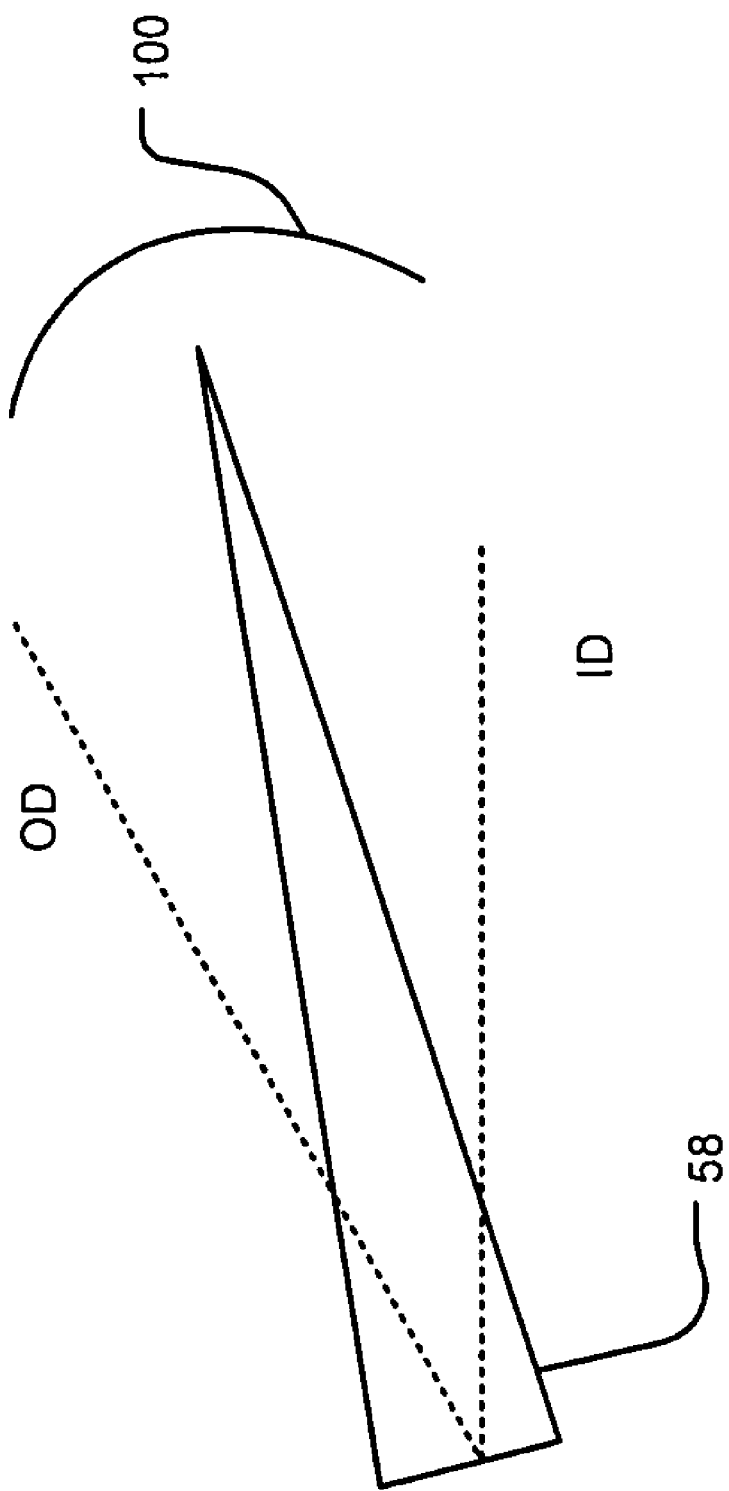
FIG. 4D depicts a pivot angle at which a circular track intersects an arc along which an actuator arm moves in a disk drive.
Figure 4E:
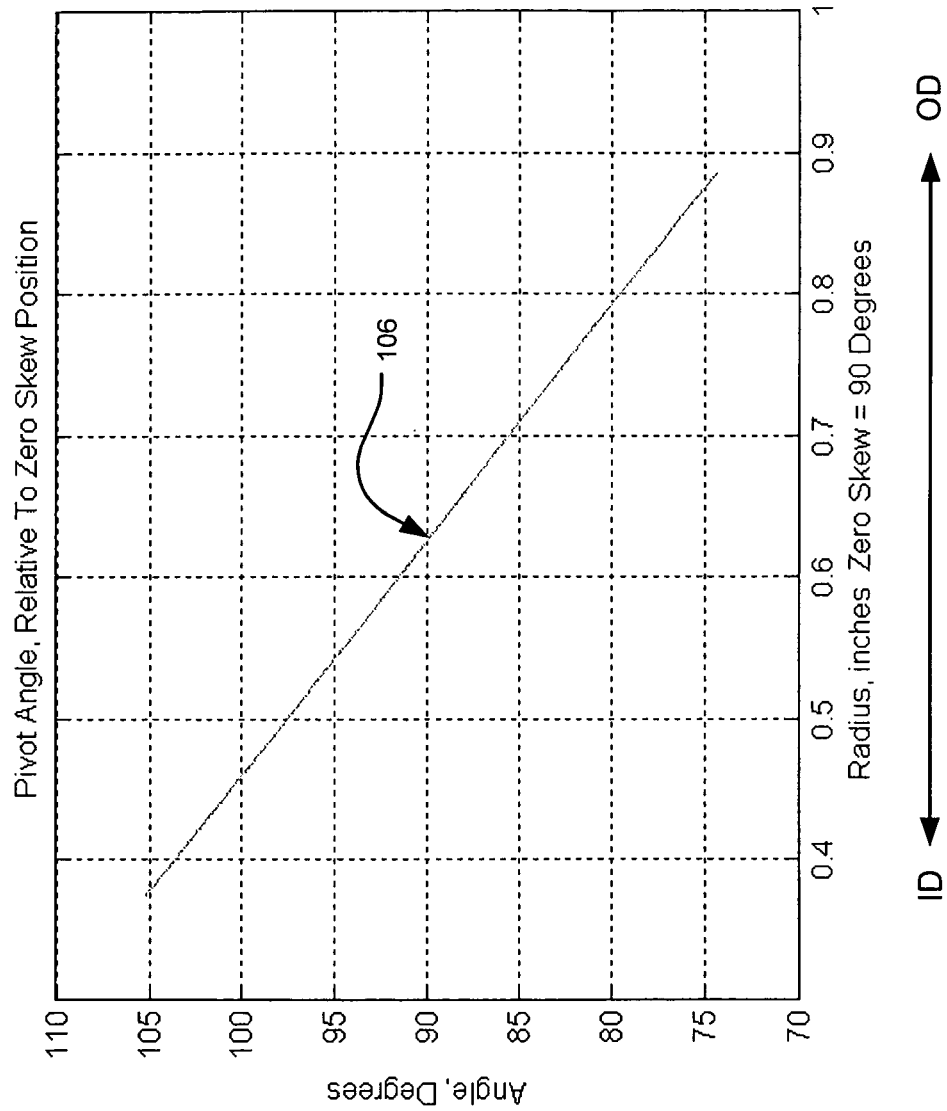
FIG. 4E is a graph of pivot angle as a function of track radius.

Additionally, since the read/write head 59 is mounted at the distal end of the actuator arm 58, the read/write head 59 travels along an arc 100 while the actuator arm 58 moves radially along the arc 100 as shown in FIG. 4D. The arc 100 intersects concentric circular tracks 70 at an angle called the actuator pivot angle or pivot angle. The pivot angle varies from ID to OD as shown in FIG. 4E. At the zero skew point, the arc 100 of the actuator arm 58 intersects the track 70 at a right angle.

Mathematically, let A=actuator velocity, B=revolutions per minute (RPM) of platters 52, C=radius of a track 70, θ=head skew angle at radius C, and φ=actuator pivot angle. The radial component of the actuator velocity is A*Cos θ, and the circumferential component of the actuator velocity is A*Sin θ. The linear disk velocity in inches per second (IPS) is B*(2πC)/60.

An expected difference or error between read-back frequency and write frequency at radius C is a ratio of the circumferential component of the actuator velocity to the linear velocity of the disk. That is, Frequency variation=(60(A*Sin θ)/B*(2πC))(Cos φ).

In other words, the frequency variation is a product of a function of the head skew angle θ and a function of the actuator pivot angle φ.

Figure 4F:
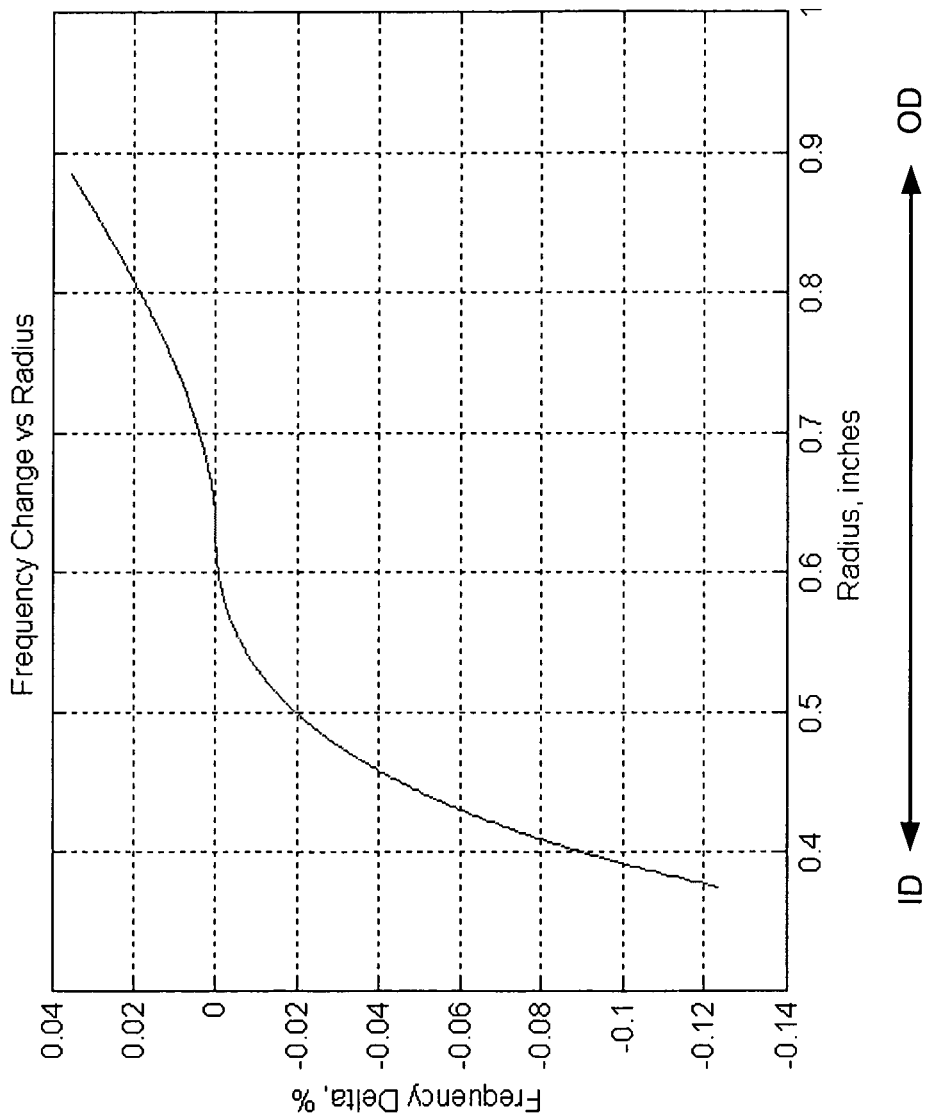
FIG. 4F is a graph of variation in read-back frequency as a function of track radius when spirals prewritten in a disk drive are read.

A combined effect of skew angle and pivot angle on the read-back frequency can be explained using a sensitivity function. The sensitivity function can be calculated for a predetermined actuator velocity using simulation. The sensitivity function helps in explaining variation in the read-back frequency as track radius varies when the actuator arm 58 moves at the target actuator velocity. FIG. 4F shows a change in read-back frequency due to changing skew and pivot angles for a particular simulated disk geometry.

Since the write frequency is known, variation in read-back frequency at different radii can be calculated from the sensitivity function as follows. A frequency delta is defined a difference between an expected read-back frequency and the write frequency divided by the write frequency. Thus, the expected read-back frequency at a particular radius and for a predetermined actuator velocity can be obtained by substituting the write frequency in the frequency delta. Using measured and expected read-back frequencies, an actual actuator velocity of the actuator arm 58 at which the spiral pattern is written can be calculated.

Figure 5A:
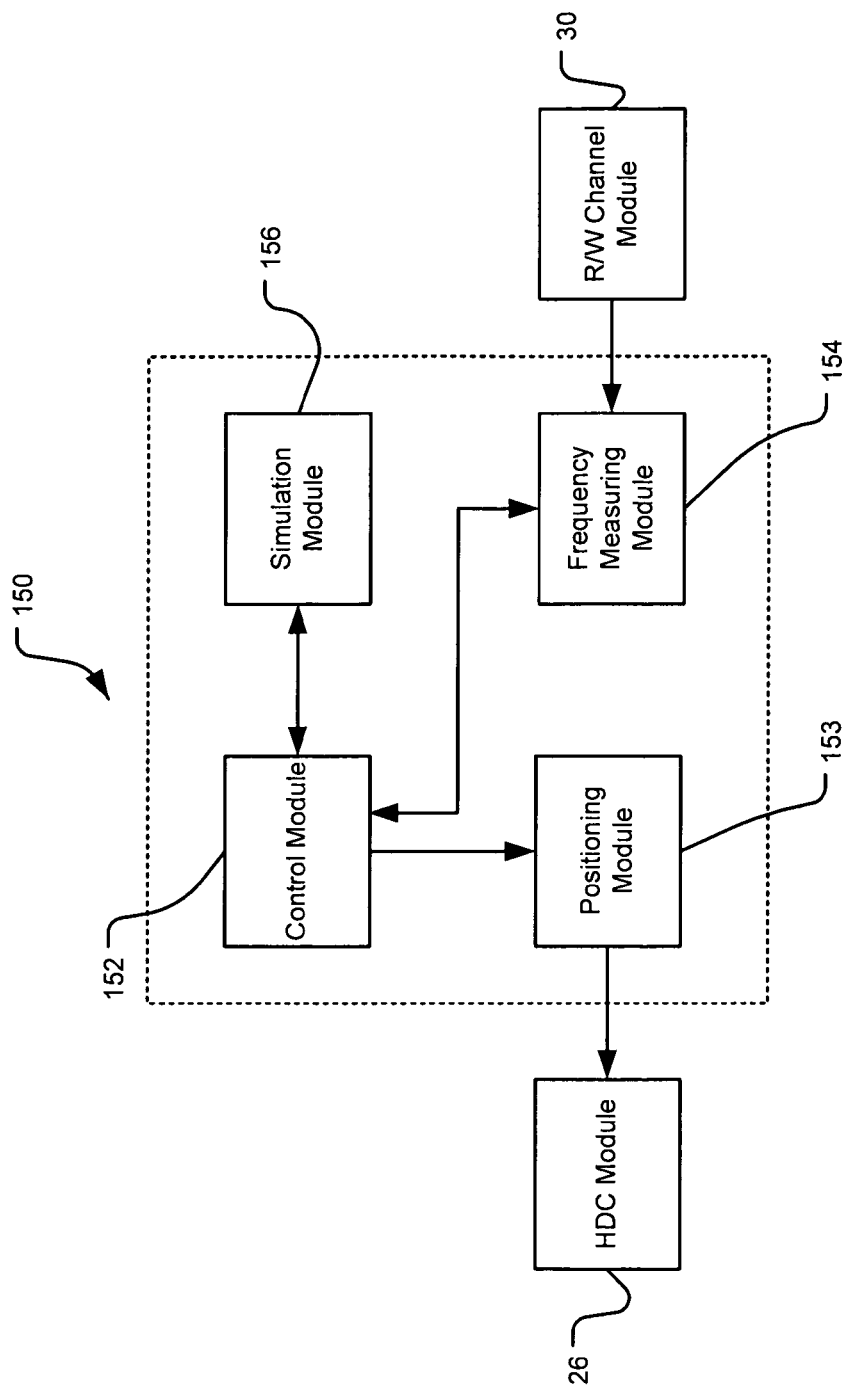
FIG. 5A is a functional block diagram of a system for measuring actuator velocity at which spirals are prewritten in a disk drive according to the present disclosure.
Figure 5B:
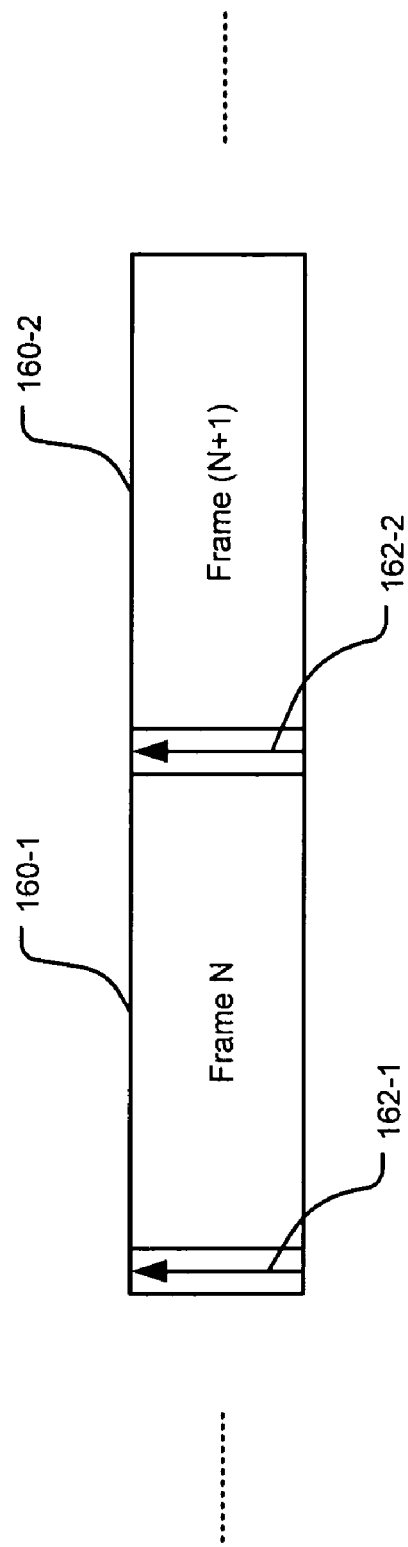
FIG. 5B depicts frames in a spiral pattern.

Referring now to FIGS. 5A-5C, a system 150 for measuring actuator velocity at which spirals are written comprises a control module 152, a positioning module 153, a frequency measuring module 154, and a simulation module 156. The system 150 calculates the actuator velocity by reading spirals and measuring a read-back frequency (i.e., a first frequency) at a known track radius. For example, the system 150 measures the read-back frequency when the actuator arm is positioned at an inner diameter (ID) crashstop. Track radius at the ID crashstop can be the known with substantial accuracy subject to tolerances of the actuator arm, the ID crashstop, etc.

The control module 152 activates or enables the positioning module 153 when the system 150 is ready to calculate the actuator velocity at which the spirals were written. The positioning module 153 communicates with a hard disk controller (HDC) module 26 that controls movement of an actuator arm (not shown). The positioning module 153 generates a command to position the actuator arm at the ID crashstop. The HDC module 26 implements the command and positions the actuator arm at the ID crashstop. A read element in a read/write head (not shown), which is mounted at a distal end of the actuator arm, reads spirals.

A typical spiral pattern comprises spiral frames 160-1, 160-2, ..., etc., (collectively spiral frames 160) as shown in FIG. 5B. Each spiral frame 160 includes a frame sync, which is a frame synchronization mark (i.e., a sync mark). For example, spiral frame 160-1 includes frame sync 162-1, spiral frame 160-2 includes frame sync 162-2, etc. Frame syncs 162-1, 162-2, ..., etc., (collectively frame syncs 162) are generally short digital signals encoded using amplitude or phase encoding schemes. The frame syncs 162 are embedded in a constant frequency field.

The read element detects frame syncs 162 while a magnetic medium rotates beneath or above the read/write head. A read/write channel module 30 that communicates with the read/write head generates a time stamp each time the read/write head detects a frame sync 162. The frequency measuring module 154, which communicates with the read/write channel module 30, calculates the read-back frequency.

Specifically, the frequency measuring module 154 measures time differences between successive time stamps for a predetermined time. The control module 152 may set the predetermined period. For example, the predetermined period may be equal to time taken by a predetermined number of revolutions of the disk drive. The frequency measuring module 154 calculates an average time between two adjacent time stamps by dividing a sum of the time differences by the predetermined time. Averaging may increase the accuracy of measuring the time between two adjacent time stamps. Additionally, averaging may reduce effect of noise. The frequency measuring module 154 inverts the average time between two adjacent time stamps to generate the read-back frequency (i.e., the measured read-back frequency). Thus, the read-back frequency represents frequency of sync marks or frequency of time stamps of the sync marks.

A table in FIG. 5C shows exemplary frame sync counts at various actuator velocities for a particular disk geometry. Although the frame sync counts in the example shown decrease as actuator velocity increases, the frame sync counts may increase as actuator velocity increases depending on the disk geometry.

Based on a known disk geometry and a known write frequency (i.e. a predetermined frequency) of the current with which the spirals were written, the simulation module 156 generates a sensitivity function for a predetermined actuator velocity. The sensitivity function is a function of a frequency delta and track radius. The frequency delta is a ratio of a difference between an expected read-back frequency and the write frequency to the write frequency. By substituting the known write frequency in the frequency delta of the sensitivity function, the simulation module 156 calculates an expected read-back frequency (i.e., a second frequency) for a known radius (e.g., at ID crashstop) and for the predetermined actuator velocity.

The control module 152 calculates the actual actuator velocity at which the spirals were written as follows. Actual actuator velocity is equal to a product of the predetermined actuator velocity and a ratio of the measured read-back frequency to the expected read-back frequency at the predetermined actuator velocity.

Figure 6:
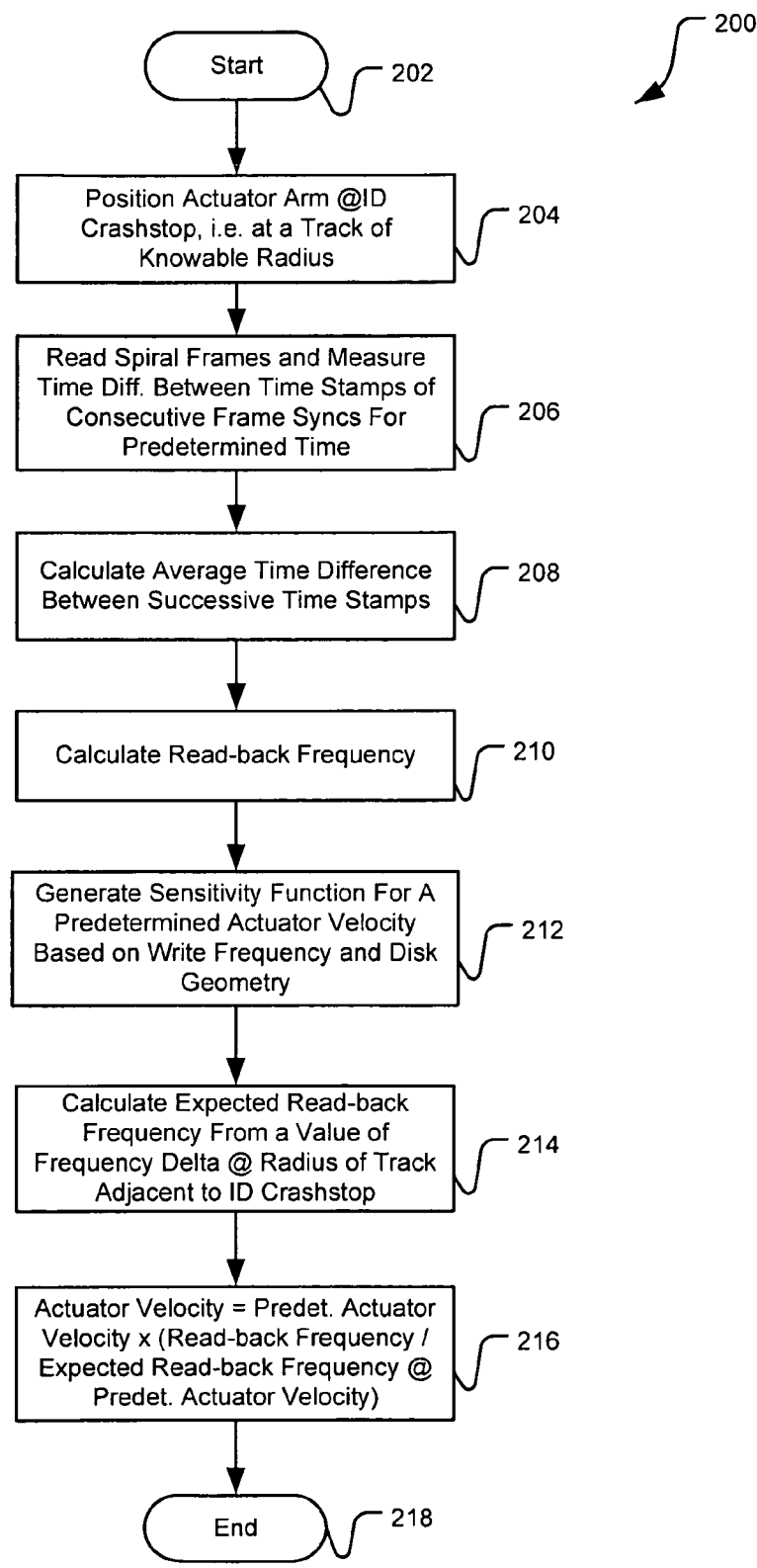
FIG. 6 is a flowchart of a method for measuring actuator velocity at which spirals are prewritten in a disk drive according to the present disclosure.

Referring now to FIG. 6, a method 200 for calculating a velocity of an actuator arm at which servo spirals were written begins at step 202. A control module 152 generates a command to position an actuator arm at an inner diameter (ID) crashstop (i.e., adjacent to a track of knowable radius) in step 204. A read element in a read/write head reads spiral frames, and a frequency measuring module 154 measures a time difference between time stamps of consecutive frame syncs detected in the spiral frames for a predetermined time in step 206. The control module 152 calculates an average time between successive time stamps in step 208. The control module 152 calculates a measured read-back frequency (i.e., a first frequency) by inverting the average time in step 210.

A simulation module 156 generates a sensitivity function for a predetermined actuator velocity in step 212 based on disk geometry and a known write frequency (i.e., a predetermined frequency) at which the spirals were written. The simulation module 156 calculates an expected read-back frequency (i.e., a second frequency) in step 214 from a value of frequency delta at a track radius corresponding to the ID crashstop using the write frequency.

The control module 152 calculates the actual actuator velocity at which the spirals were written by multiplying the predetermined actuator velocity by a ratio of the measured read-back frequency to the expected read-back frequency at the predetermined actuator velocity in step 216. The method 200 ends in step 218.

Figure 7A:
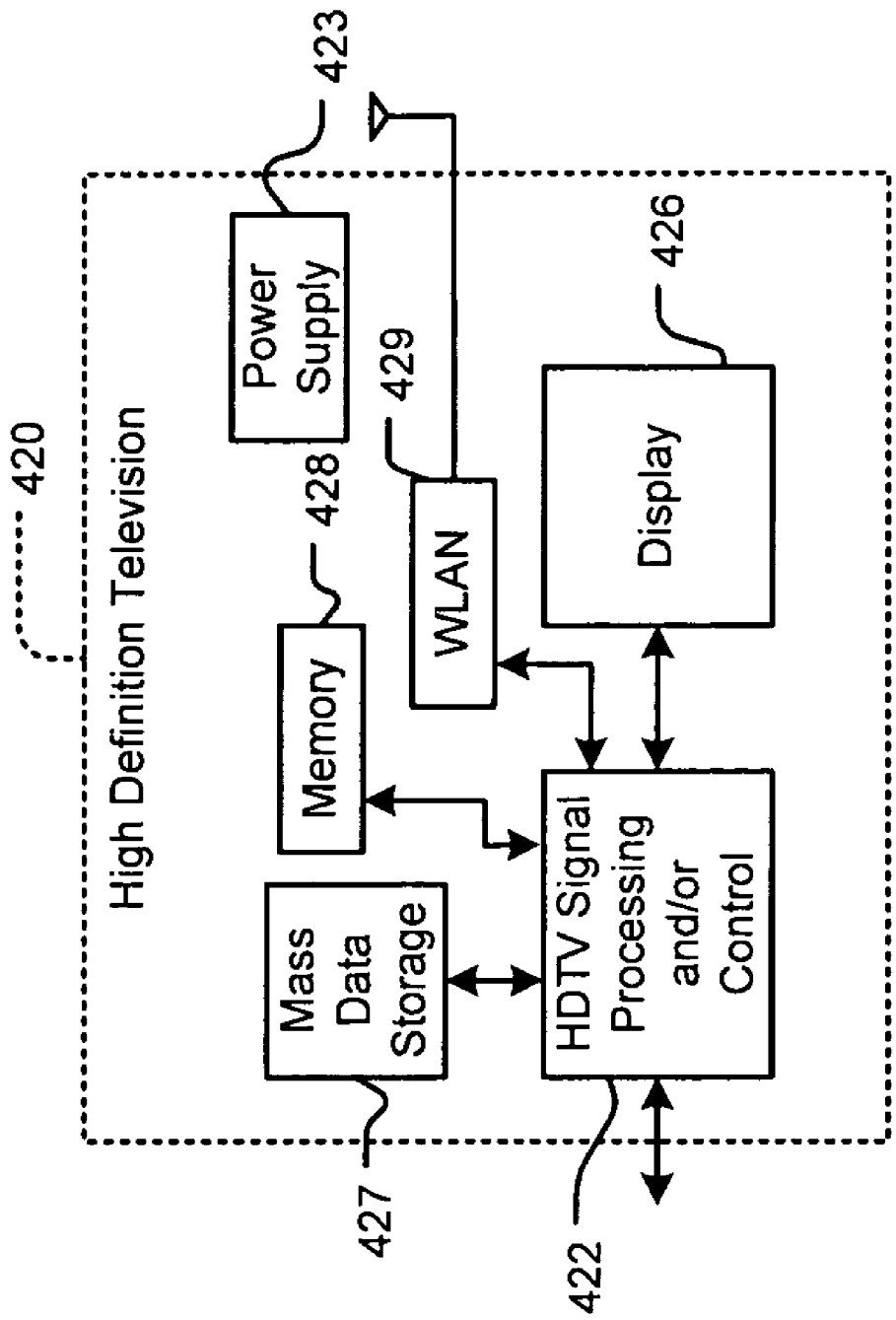
FIG. 7A is a functional block diagram of a high definition television.

Referring now to FIGS. 7A-7E, various exemplary implementations of the system 150 are shown. Referring now to FIG. 7A, the system 100 can be implemented in mass data storage 427 of a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The HDD may be a mini HDD that includes one or more platters having a diameter that is smaller than approximately 1.8" The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 7B, the system 150 may be implemented in mass data storage 446 of a control system 430 of a vehicle. In some implementations, a powertrain control system 432 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

Other control systems 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. The HDD may be a mini HDD that includes one or more platters having a diameter that is smaller than approximately 1.8"The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Referring now to FIG. 7C, the system 150 can be implemented in mass data storage 464 of a cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8"The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 7D:
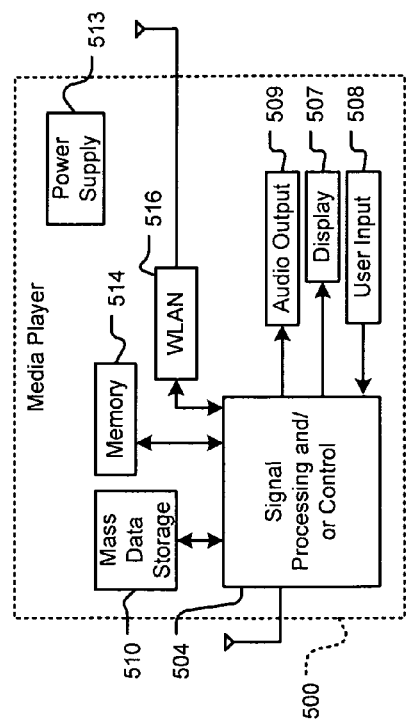
FIG. 7D is a functional block diagram of a set top box.

Referring now to FIG. 7D, the system 150 can be implemented in mass data storage 490 of a set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8"The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 7E:
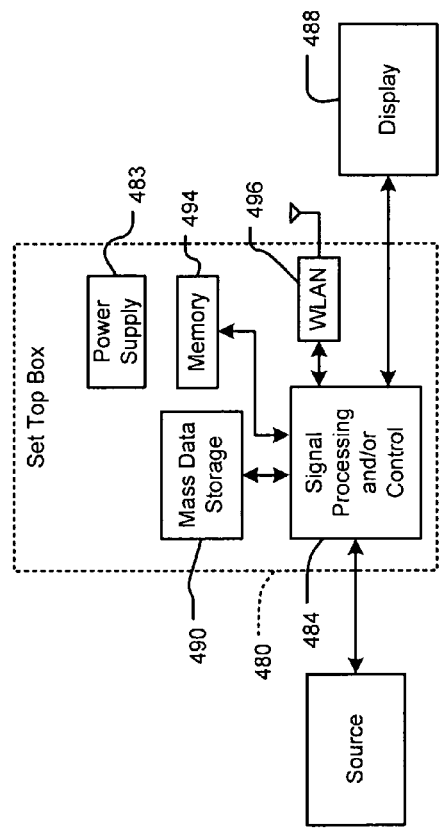
FIG. 7E is a functional block diagram of a media player.

Referring now to FIG. 7E, the system 150 can be implemented in mass data storage 510 of a media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8"The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system, comprising:
a positioning module that positions an actuator arm to read spirals that are prewritten;
a frequency measuring module that measures a first frequency of sync marks of said spirals;
an estimation module that calculates a second frequency of said sync marks when said actuator arm moves at a predetermined actuator velocity; and
a control module that calculates an actuator velocity at which said spirals are prewritten based on said first frequency, said second frequency, and said predetermined actuator velocity.

2. The system of claim 1 further comprising a hard disk controller (HDC) module that communicates with said positioning module and that receives a command from said positioning module to position said actuator arm.

3. The system of claim 1 wherein said positioning module positions said actuator arm adjacent to a crashstop in a disk drive.

4. The system of claim 1 wherein said frequency measuring module measures said first frequency when said actuator arm is positioned adjacent to a crashstop in a disk drive.

5. The system of claim 1 wherein said frequency measuring module calculates said first frequency based on a difference between time stamps of adjacent ones of said sync marks.

6. The system of claim 5 wherein said frequency measuring module calculates said first frequency based on an average of time differences between time stamps of adjacent ones of said sync marks.

7. The system of claim 1 wherein said estimation module selects a sensitivity function for said predetermined actuator velocity based on a geometry of a disk drive.

8. The system of claim 7 wherein said estimation module calculates said second frequency based on said sensitivity function, said predetermined frequency and a radius of a track.

9. The system of claim 7 wherein said sensitivity function is based on a frequency delta and a radius of a track, and wherein said frequency delta is a ratio of a difference between said second and said predetermined frequencies to said predetermined frequency.

10. The system of claim 7 wherein said estimation module calculates said second frequency by selecting a value of said sensitivity function at a radius of track and by substituting said predetermined frequency in said sensitivity function.

11. The system of claim 1 wherein said control module calculates said actuator velocity based on a product of said predetermined actuator velocity and a ratio of said first frequency to said second frequency at said predetermined actuator velocity.

12. The system of claim 1 further comprising a read-write channel module that generates time stamps when said sync marks are detected.

13. A method, comprising:
positioning an actuator arm to read spirals that are prewritten;
measuring a first frequency of sync marks of said spirals;
calculating a second frequency of said sync marks when said actuator arm moves at a predetermined actuator velocity; and
calculating an actuator velocity at which said spirals are prewritten based on said first frequency, said second frequency, and said predetermined actuator velocity.

14. The method of claim 13 further comprising executing a command to position said actuator arm adjacent to said track.

15. The method of claim 13 further comprising generating a command to position said actuator arm adjacent to a crashstop in a disk drive.

16. The method of claim 13 further comprising measuring said first frequency when said actuator arm is positioned adjacent to a crashstop in a disk drive.

17. The method of claim 13 further comprising calculating said first frequency based on a difference between time stamps of adjacent ones of said sync marks.

18. The method of claim 17 further comprising calculating said first frequency based on an average of time differences between time stamps of adjacent ones of said sync marks.

19. The method of claim 13 further comprising selecting a sensitivity function for said predetermined actuator velocity based on a geometry of a disk drive.

20. The method of claim 19 further comprising calculating said second frequency based on said sensitivity function, said predetermined frequency and a radius of a track.

21. The method of claim 19 wherein said sensitivity function is based on a frequency delta and a radius of a track, and wherein said frequency delta is based on a ratio of a difference between said second and said predetermined frequencies to said predetermined frequency.

22. The method of claim 19 further comprising calculating said second frequency by selecting a value of said sensitivity function at a radius of a track and by substituting said predetermined frequency in said sensitivity function.

23. The method of claim 13 further comprising calculating said actuator velocity based on a product of said predetermined actuator velocity and a ratio of said first frequency to said second frequency at said predetermined actuator velocity.

24. The method of claim 13 further comprising generating time stamps when said sync marks are detected.

* * * * *

UNITED STATES PATENT AND TRADEMARK OFFICE
CERTIFICATE OF CORRECTION

PATENT NO. : 7,567,404 B1
APPLICATION NO. : 12/077582
DATED : July 28, 2009
INVENTOR(S) : David Rutherford et al.

Page 1 of 1

It is certified that error appears in the above-identified patent and that said Letters Patent is hereby corrected as shown below:

| | |
|---|---|
| Column 8, Line 48 | Insert -- as -- after "defined" |
| Column 8, Line 66 | Delete "the" after "be" |
| Column 11, Line 10 | Insert -- . -- after "1.8"" |
| Column 11, Line 35 | Insert -- . -- after "1.8"" |
| Column 11, Line 57 | Insert -- . -- after "1.8"" |
| Column 12, Line 19 | Insert -- . -- after "1.8"" |
| Column 13, Line 13 | Insert -- a -- after "of" |

Signed and Sealed this

Fifteenth Day of September, 2009

David J. Kappos
*Director of the United States Patent and Trademark Office*